(12) United States Patent
Wang et al.

(10) Patent No.: US 10,974,616 B2
(45) Date of Patent: Apr. 13, 2021

(54) HIGH-VOLTAGE SYSTEM WITH LOW-VOLTAGE CONTROL ARCHITECTURE AND METHOD

(71) Applicant: GM Global Technology Operations LLC, Detroit, MI (US)

(72) Inventors: Fang Wang, Troy, MI (US); Jeffrey Johnson, Clarkston, MI (US); Theodore T. Kim, Rochester Hills, MI (US); Tao Wang, Oakland Township, MI (US); Janpreet S. Basi, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 16/015,896

(22) Filed: Jun. 22, 2018

(65) Prior Publication Data

US 2019/0389316 A1    Dec. 26, 2019

(51) Int. Cl.
*H02J 7/00*        (2006.01)
*B60L 58/12*       (2019.01)
*B60L 50/51*       (2019.01)
*B60L 58/22*       (2019.01)
*B60L 50/60*       (2019.01)

(52) U.S. Cl.
CPC .............. *B60L 58/12* (2019.02); *B60L 50/51* (2019.02); *B60L 50/66* (2019.02); *B60L 58/22* (2019.02); *B60L 2220/44* (2013.01); *H02J 2207/20* (2020.01)

(58) Field of Classification Search
CPC .......... B60L 58/12; B60L 58/22; B60L 50/66; B60L 50/51; B60L 2220/44; B60L 2240/547; B60L 2240/549; B60L 58/20; H02J 2207/20; H01M 2220/20; H01M 10/482; H01M 10/425; H01M 2010/4271
See application file for complete search history.

(56) References Cited

U.S. PATENT DOCUMENTS

2014/0354212 A1* 12/2014 Sugeno ................... H02J 50/10
                                                    320/103
2018/0069425 A1*  3/2018 Mastrandrea ............ B60K 6/32

* cited by examiner

*Primary Examiner* — Rexford N Barnie
*Assistant Examiner* — Elim Ortiz
(74) *Attorney, Agent, or Firm* — Quinn IP Law

(57) ABSTRACT

A high-voltage electrical system includes a high-voltage electrical bus, a low-voltage controller performing battery management system (BMS) functions, and a rechargeable energy storage system (RESS) connected to the HV electrical bus. The RESS has contactors connected to the voltage rails, a battery pack, a current sensor outputting a voltage signal indicative of pack current, cell monitoring units (CMUs) connected to designated battery cells that measure corresponding cell voltages, and voltage isolation hardware between the CMUs and the LV controller. The voltage isolation hardware includes the contactors and may include a transformer. The RESS and LV controller are connected via LV serial connections such that the LV controller performs the designated BMS functions, including monitoring the pack current and controlling an open/closed state of the contactors. A powertrain system includes the electrical system, an electric machine, and a coupled load.

20 Claims, 4 Drawing Sheets

HIGH-VOLTAGE SYSTEM WITH LOW-VOLTAGE CONTROL ARCHITECTURE AND METHOD

INTRODUCTION

Electric powertrains employ one or more electric machines to generate torque. The generated torque is delivered to a coupled load, e.g., via a transmission or transaxle. When the electric machine is operated as an electric traction motor, the electrical power needed for energizing phase windings of the traction motor is provided by a rechargeable energy storage system (RESS). The RESS, which includes a multi-cell battery pack, associated power electronics, and thermal regulation hardware, may be controlled via a resident battery control module, more commonly referred to as a Battery Monitoring System (BMS).

A BMS may be used to monitor the ongoing health of hardware and software components of the RESS, as well as to control charging and discharging operations of the battery pack. Other functions performed by a BMS may include monitoring and reporting of battery pack voltage, individual cell voltages and cell currents, states of charge, and temperatures. The BMS may also perform periodic cell balancing operations to equalize the states of charge of the various battery cells. Individual cell voltages are measured and monitored using associated circuitry so as to keep the battery cells within a permitted voltage window, thereby preventing premature cell degradation.

SUMMARY

A high-voltage (HV) electrical system is disclosed herein. A low-voltage (LV) control architecture, as described below with reference to the various Figures, offloads battery management system (BMS) functionality to an LV controller. The LV controller is linked to an HV rechargeable energy storage system (RESS) by a hardwired or wireless connection. In an illustrative embodiment, the term "high-voltage" may refer to at least 60 volts direct current (60 VDC), with "low-voltage" referring to voltage levels that are less than high-voltage levels, e.g., auxiliary voltage levels of 12-15 VDC. The term "BMS functionality" as used herein refers to a defined set of battery management and vehicle control functions, including but not necessarily limited to the ongoing monitoring and control decisions responsive to battery pack and cell voltages and currents, states of charge, contactor open/closed states, high-voltage interlock (HVIL) status, charging status, Heating, Ventilation, and Air Conditioning (HVAC), and thermal controls.

The present approach is intended as an improvement over battery control architectures in which BMS functionality resides within the RESS at high-voltage levels. Offloading designated BMS monitoring and control functions from the RESS to the LV controller may free up valuable packaging space within the RESS. In turn, doing so may improve battery packaging flexibility, commonality or reusability of the disclosed architecture across other platforms, while providing additional attendant benefits as set forth herein.

The LV control architecture may have both hardwired analog and digital implementations, as well as a wireless/radio frequency (RF) implementation. HV voltage isolation is provided in the various disclosed embodiments.

An embodiment of the high-voltage (HV) electrical system includes an HV electrical bus having positive and negative voltage rails, an LV controller configured to perform designated BMS functions within the HV electrical system, and an RESS connected to the HV electrical bus. The RESS has first and second sets of contactors connected to the positive and negative voltage rails, respectively. Such contactors are used as voltage isolation hardware such that, when the contactors are opened, the HV RESS is isolated from high-voltage components such as a power inverter module (PIM), onboard charging module (OBCM), and auxiliary power module (APM). The RESS also has a battery pack with a plurality of battery cells. A current sensor is positioned with respect to one of voltage rails. The current sensor outputs a voltage signal, e.g., a 0-5 VDC proportional voltage, which is indicative of a measured pack current, i.e., an electrical current flowing into or out of the battery pack.

Cell monitoring units (CMUs) are electrically connected to the designated battery cells and configured to measure corresponding individual cell voltages. Voltage isolation hardware may be disposed between the CMUs and the LV controller in certain hardwired implementations, with the voltage isolation hardware possibly including a transformer in addition to the above-noted contactors. The RESS and LV controller may be connected via LV serial connections in such an embodiment. BMS functions may include monitoring the pack current and controlling an open/closed state of the contactors responsive to the pack current and/or other operating conditions.

The voltage isolation hardware in the hardwired embodiment may be combined or integrated with one of the CMUs.

The voltage isolation hardware may include a first current limiting resistor connected to the negative voltage rail and a second current limiting resistor connected to the positive voltage rail, a bias resistor connected to one of the positive or negative voltage rails, and a switch selectively controlling the bias resistor responsive to switch control signals from the LV controller. The LV controller in this particular embodiment measures a level of voltage isolation using voltage sensors and a voltage divider arrangement, and controls operation of the above-noted switch.

The LV controller may also monitor high-voltage interlock (HVIL) signals, thermal conditions of the battery cells, and/or charging operations of the battery cells as part of the designated BMS functions.

Each CMU may optionally include an RF transceiver which wirelessly transmits the corresponding cell voltages, temperatures, and diagnostic information to a corresponding RF transceiver of the LV controller.

The LV serial connections may include a twisted pair of conductors when the corresponding cell voltages are digital voltage signals, or the LV serial connections may include a pair of straight conductors when the corresponding cell voltages are analog voltage signals.

A powertrain system is also disclosed herein that includes a polyphase electric machine having a rotor. The powertrain system also includes a load, e.g., drive wheels of an example vehicle, and a transmission. The transmission includes an input member selectively coupled to the rotor, and an output member coupled to the load.

The above features and advantages and other features and advantages of the present disclosure will be apparent from the following detailed description of the best modes for carrying out the disclosure when taken in connection with the accompanying drawings.

Figure 1:
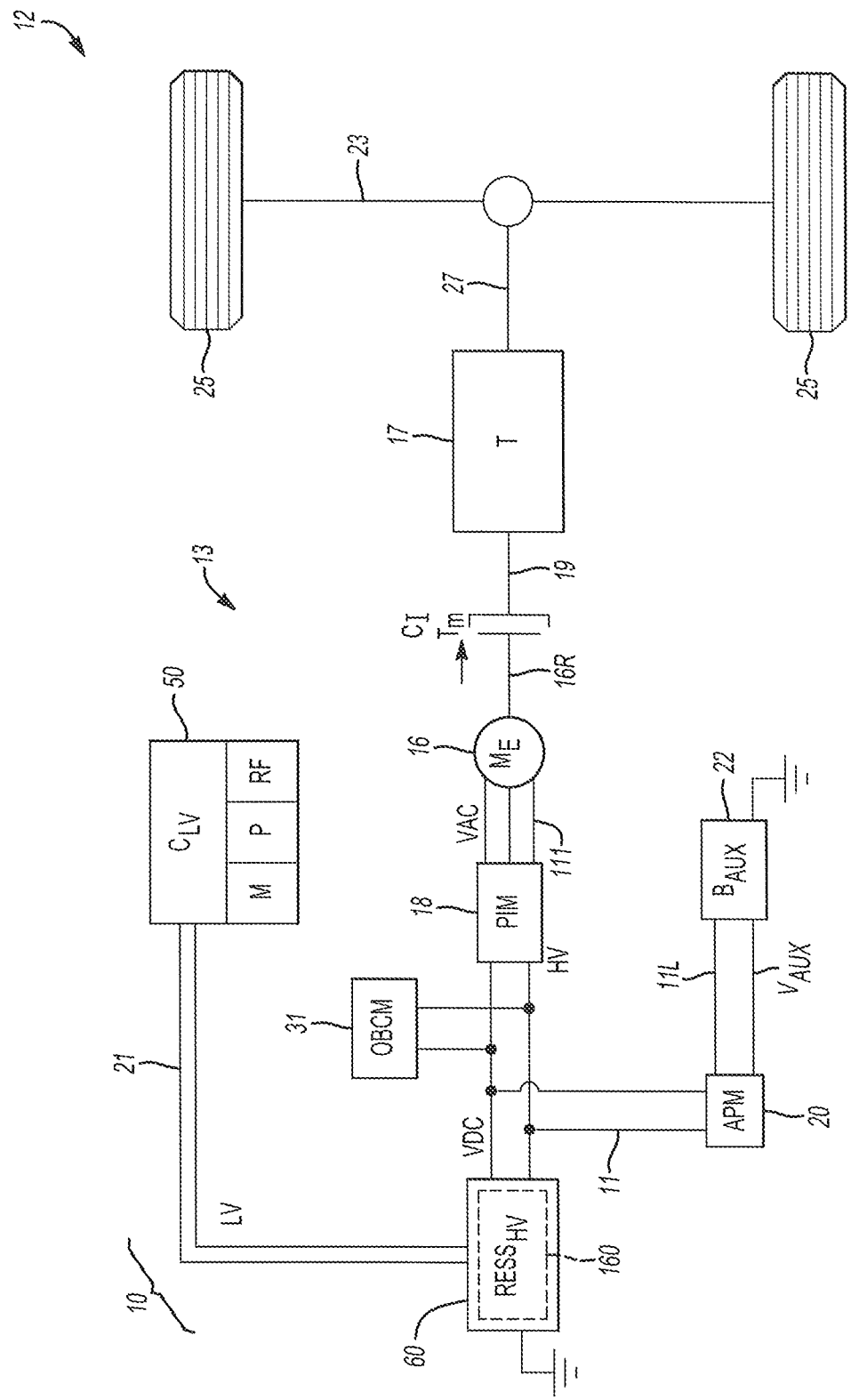
FIG. 1 is a schematic illustration of an example high-voltage (HV) electrical system having a rechargeable energy storage system (RESS) and a low-voltage (LV) controller and associated control architecture as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Embodiments of the present disclosure are described herein. The various embodiments are examples of the present disclosure, with other embodiments in alternative forms being conceivable by one of ordinary skill in the art in view of the disclosure. The figures are not necessarily to scale. Some features may be exaggerated or minimized to show details of particular components. Therefore, specific structural and functional details disclosed herein are not to be interpreted as limiting, but rather as a representative basis for teaching one skilled in the art to variously employ the present disclosure.

As those of ordinary skill in the art will also understand, features illustrated and described with reference to a given one of the figures may be combinable with features illustrated in one or more other figures in order to produce embodiments that are not explicitly illustrated or described. The combinations of features illustrated thus serve as representative embodiments for typical applications. Various combinations and modifications of the features consistent with the teachings of this disclosure, however, could be desired for particular applications or implementations.

Referring to the drawings, wherein like reference numbers refer to like components, a high-voltage (HV) electrical system 10 is schematically depicted in FIG. 1. The HV electrical system 10 may be used as part of a non-limiting example motor vehicle 12, with the vehicle 12 described hereinafter for illustrative consistency as a representative application of the HV electrical system 10. However, one of ordinary skill in the art will appreciate that the HV electrical system 10 may be used advantageously in rail-based, marine, or aerospace vehicles, mobile platforms, power plants, or robots without limitation.

The HV electrical system 10 may be used as part of an electric powertrain system 13 having a low-voltage (LV) controller 50. The HV electrical system 10 also includes a rechargeable energy storage system (RESS) 60, with the LV controller 50 and the RESS 60 respectively labeled as $C_{LV}$ and $RESS_{HV}$ to represent the HV and LV levels of the RESS 60 and LV controller 50, respectively.

As will be described below in further detail with reference to FIGS. 2-4, the LV controller 50 and the RESS 60 may be linked by LV serial connections 21 in hardwired or wireless configurations. In an illustrative example embodiment, for instance, the RESS 60 may have voltage capacity of at least 60 volts direct current (60 VDC), up to 300 VDC or more, while the LV controller 50 in such an embodiment is at auxiliary voltage levels, i.e., nominally 12-15 VDC in the illustrated vehicle 12. Certain defined BMS control functions are offloaded from the RESS 60 to the LV controller 50 as explained below with reference to the implementations of FIGS. 2-4. Such an approach may help free up valuable packaging space within the RESS 60 and thereby improve battery packaging flexibility and commonality or reusability across other platforms.

The powertrain system 13 of FIG. 1 includes an electric traction motor ($M_E$) 16 configured to generate motor torque (arrow $T_M$) when energized by the RESS 60 over a direct current (VDC) HV electrical bus 11 having positive (+) and negative (−) rails with terminals HV+ and HV− connected to high-voltage components such as an onboard charging module (OBCM) 31. The electric traction motor 16 having a rotor 16R may be embodied as a polyphase device, in which case a power inverter module (PIM) 18 may be disposed between the HV electrical bus 11 and an alternating current (VAC) HV electrical bus 111. Although omitted for clarity, the PIM 18 includes semiconductor switches and other semiconductor components whose states are controlled, e.g., using pulse width modulation (PWM) signals commanded by a motor control processor (not shown). PWM switching control thus converts a DC voltage to an AC voltage and vice versa, as needed based on the power flow commanded by the LV controller 50.

As part of the electric powertrain system 13, a drive axle 23 may be mechanically coupled to a load, such as set of drive wheels 25 in a vehicular embodiment. The motor torque (arrow $T_M$) may be delivered across an input clutch (CI) to an input member 19 of a transmission (T) 17, e.g., one or more planetary gear sets, and ultimately to an output member 27 of the transmission 17 coupled to the drive axle 23. Alternatively, the electric traction motor 16 may be embodied as a wheel hub motor disposed directly on the drive wheels 25.

The RESS 60 includes a multi-cell, high-voltage battery pack 160, for instance a lithium-ion or nickel-metal hydride battery pack 160. Although depicted schematically for illustrative simplicity, such a battery pack 160 may be constructed of multiple interconnected battery cell stacks, with each cell stack including several battery cells. The contents of the individual battery cells, including electrodes and separator materials, may be enclosed within a sealed foil pouch containing an electrolyte material. The number and configuration of the cells ultimately determines the voltage capacity of the battery pack 160, with voltages of 60-300 VDC or more being usable for propulsion purposes aboard the vehicle 12 as noted above.

An auxiliary battery ($B_{AUX}$) 22 may be electrically connected to the RESS 60 via an auxiliary power module (APM) 20. The APM 20 may be embodied as a voltage converter operable for reducing a bus voltage from the RESS 60 and the HV electrical bus 11 to auxiliary voltage levels ($V_{AUX}$) on an LV electrical bus 11L, at levels suitable for charging the auxiliary battery 22 and/or powering one or more connected auxiliary voltage devices (not shown) such as wiper motors or display screens.

The LV controller 50 may be an integral portion of, or a separate module operatively connected to, other electronic controllers or control processors of the vehicle 12 or the powertrain system 13. The LV controller 50 may include a microprocessor (P) and sufficient memory (M), i.e., transitory and non-transitory (e.g., tangible) memory that participates in providing data or instructions in a form that may be read by the processor (P). In some embodiments, the LV controller 50 may include a radio frequency (RF) transceiver configured to wireless transmit and receive data during ongoing communications with the RESS 60. Data and instructions may be transmitted at low-voltage by one or more transmission media or transfer conductors, with BMS function-related data exchanged between the RESS 60 and the LV controller 50 in the low-voltage control architecture. Example embodiments of the architecture will now be described with reference to FIGS. 2-4.

Figure 2:
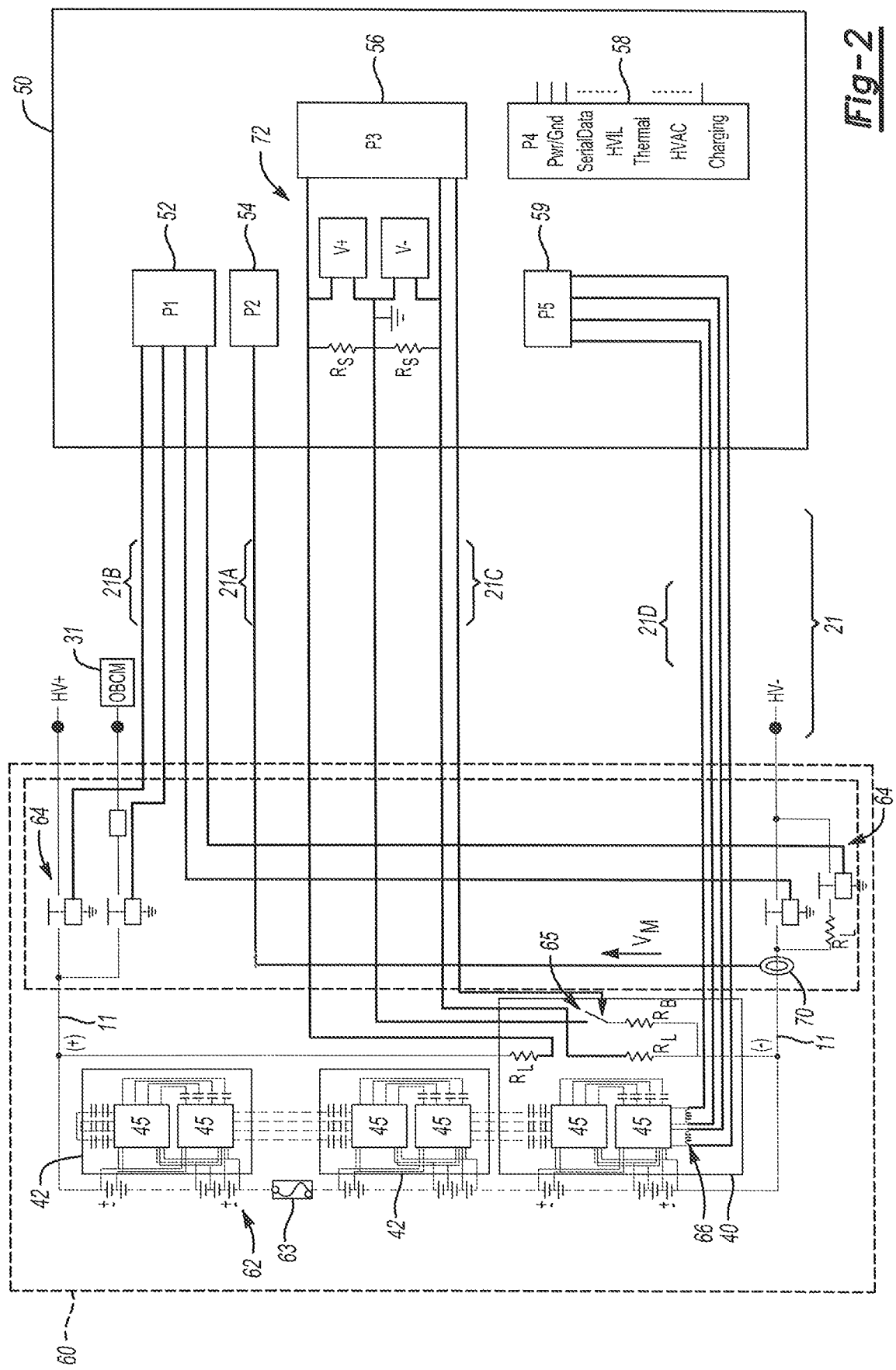
FIGS. 2 and 3 are schematic control diagrams describing exemplary analog and digital hardwired implementations of the HV electrical system FIG. 1.
Figure 3:
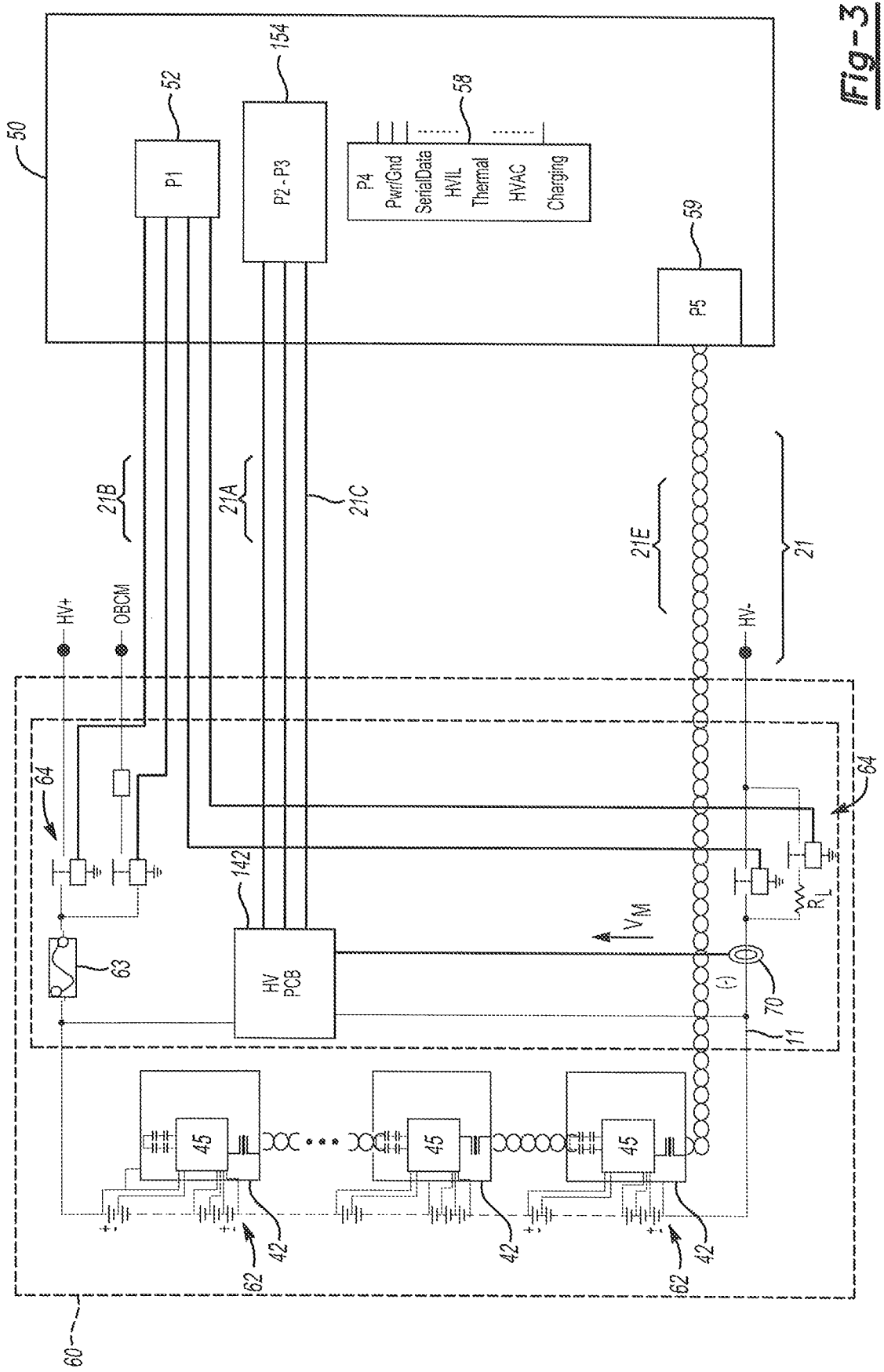

FIGS. 2 and 3 depict possible example embodiments for implementing the present LV architecture in the electric powertrain system 13 shown schematically in FIG. 1 in hardwired implementations, which may be either analog (FIG. 2) or digital (FIG. 3) in different embodiments. FIG. 4 provides an optional wireless/RF implementation in which battery management data or information is communicated wirelessly between the RESS 60 and the LV controller 50, thereby eliminating the need for transformer-based voltage isolation hardware within the RESS 60.

Referring to the analog hardwired embodiment of FIG. 2, this implementation enables HV isolation and sensing using associated analog circuitry. The LV controller 50 may be placed in direct/hardwired communication with the RESS 60 via the LV serial connections 21 noted generally above, with the LV serial connections 21 possibly including LV serial connections 21A, 21B, 21C, and 21D. In the particular embodiment of FIG. 2, some of the LV serial connections 21 carry low-voltage analog signals from the RESS 60 and, as a result, may be embodied as a 2-wire serial peripheral interface (SPI) connection, a 2-wire Universal Asynchronous Receiver/Transmitter (UART), or a 2-wire differential serial communication system. The RESS 60 includes a pack fuse 63 and a plurality of battery cells 62, which are arranged in electrical series across the positive (+) voltage rail and the negative (−) voltage rail of the HV electrical bus 11 in the example configuration. A current sensor 70 is located within the RESS 60, with an output signal of the current sensor 70 being a low voltage signal indicative of the measured pack current, and with the current sensor 70 shown schematically on the negative (−) rail of the HV electrical bus 11 in FIG. 2.

The RESS 60 includes a number (n) of cell monitoring units 42 (CMU1, . . . , CMUn) and a "gateway" CMU (GMU) 40, with the CMUs 42 and the GMU 40 possibly embodied as application-specific integrated circuits (ASICs) or processor chips. The CMUs 42 are also commonly referred to in the art as cell measurement, battery sensing, or cell sensing units, and thus include resident cell sense hardware 45. The cell sense hardware 45 of the CMUs 42 and the GMU 40 are electrically connected to designated battery cells 62, with the sense hardware 45 configured to measure individual cell voltages and temperatures of one or more sections of the battery cells 62. Data signals indicative of the measured information is ultimately reported to the LV controller 50 over the LV serial connections 21. Within the RESS 60, the GMU 40 may be configured to perform the above-noted cell monitoring functions for some of the battery cells 62, and thus serves as another CMU 42. Additionally, the GMU 40 may be configured with voltage isolation hardware, e.g., to ensure galvanic voltage isolation between the RESS 60 and the LV controller 50, which is particularly important in hardwired analog implementations.

For this purpose, the GMU 40 may include current limiting resistors ($R_L$) and a bias resistor ($R_B$), along with a switch 65 and a transformer 66, e.g., an inductor. Operation of the various hardware components forms a galvanic isolation barrier, as will be appreciated by one of ordinary skill in the art. The switch 65 is opened or closed in response to signals from the LV controller 50 to enable voltage isolation measurement, with the bus voltage measured between the positive (+) voltage rail and electrical ground, as well as between the negative (−) voltage rail and electrical ground, with the resistance level on the HV electrical bus 11 ultimately calculated as part of the voltage isolation measurements, as will be understood by one of ordinary skill in the art.

The LV controller 50 may include first, second, third, fourth, and fifth LV control blocks 52, 54, 56, 58, and 59, which are respectively labeled P1, P2, P3, P4, and P5. The LV control blocks 52, 54, 56, 58, and 59 are depicted separately for illustrative clarity, and represent discrete or dedicated blocks of control logic and not necessarily separate hardware devices. That is, the LV controller 50 may be a unitary control device, such as an electronic control unit or microprocessor, and/or individual ASICs or processor chips.

BMS control functionality may be offloaded from the RESS 60 and its high-voltage levels to the LV controller 50 in the following manner. The first control block 52 may be configured as a contactor state controller which transmits binary data to open and close high-voltage contactors 64 located within the RESS 60 as voltage isolation hardware. A binary 1 may be transmitted over the LV serial connections 21B to close the contactors 64 and a binary 0 transmitted to cause the contactors 64 to open. The open/closed state of the contactors 64 thus connects or disconnects designated high-voltage electrical loads (not shown) from or to the positive (+) and negative (−) voltage rails of the HV electrical bus 11, e.g., the APM 20 of FIG. 1, air conditioning or heating modules, pumps, etc. The OBCM 31 of FIG. 1, an electrical lead to which is shown schematically in FIG. 2, acts in a manner similar to that of the PIM 18, and is operable for receiving AC power from an offboard power supply, e.g., the electrical grid, and converting the AC power to DC power for charging the battery pack 160.

Additionally, the second control block 54 may be configured to monitor the pack current, i.e., the total electrical current flowing to and from the battery pack 160 of the RESS 60 as measured by current sensor 70. The current sensor 70 is configured to measure pack current and output a voltage signal (arrow $V_M$) that is proportional to or otherwise indicative of the pack current to the LV controller 50, e.g., over the LV serial connections 21A. The voltage signal (arrow $V_M$) from the current sensor 70 is ultimately used by the LV controller 50 to calculate or derive the pack current.

The third control block 56 may be configured as pack monitoring logic block, and thus may be configured to determine the pack voltage of the battery pack 160/RESS 60. Within the GMU 40, the current limiting resistors ($R_L$) may be connected to each of the positive (+) and negative (−) bus rails as shown, and the biasing resistor ($R_B$) and current limiting resistors ($R_L$) may be collectively used as part of the GMU 40 to limit the voltage and current to the third control block 56 within the LV controller 50.

In a non-limiting example embodiment, the current limiting resistors ($R_L$) located in the RESS 60 may be about 5-6 mega-Ohms (MΩ) each. Other resistance levels may be used in different embodiments depending on the voltage capacity and current levels of the battery cells 62. Adjacent to the third control processor 56, the LV controller 50 may include a voltage divider arrangement 72 with sense resistors ($R_S$) enabling the positive (V+) and negative (V−) voltages on the HV electrical bus 11 to be determined, i.e., via control of the switch 65. Pack voltage, current, and voltage isolation measurements are thus determined by the LV controller 50 over the LV serial connections 21C.

Still referring to FIG. 2, the fourth control block 58 may be configured to measure and report, at low-voltage levels, other relevant data pertinent to operation of the RESS 60, e.g., power/ground (Pwr/Gnd), serial data (SD), high-voltage interlock (HVIL) signals, thermal signals (Th), heating, ventilation and air conditioning (HVAC) control signals, and charging status signals (Chg). While shown collectively in a single logic block, such functions may physically reside on different hardware elements or a single ASIC or processor chip in different embodiments.

The fifth control block 59 of the LV controller 50 may be embodied as a communication protocol chip connected to the GMU 40, e.g., a serial interface device enabling communications between the GMU 40 and the various connected CMUs 42 with the LV controller 50. The LV controller 50 and its fifth control block 59 may be connected to the GMU 40 in the illustrated embodiment of FIG. 2 via the LV serial connections 21D.

FIG. 3 depicts a digital implementation of the LV control architecture shown in FIG. 2. Here, HV is measured inside of the RESS 60 and transmitted serially to the LV controller 50. In addition to having the benefit of LV serial communication, the embodiment of FIG. 3 enables transmission of the measured pack voltage signal (arrow $V_M$) through the same serial pins providing the LV serial communication. Instead of the LV serial connections 21D of FIG. 2, the circuit of FIG. 3 includes LV serial connections 21E in the form of a twisted conductor connection such as Ethernet. In digital implementations, data may be in the form of a modulated voltage signal or differential voltage. The twisted conductor of LV serial connections 21E thus is intended to lower the signal-to-noise ratio of digital transmissions between the RESS 60 and the LV controller 50. Such twisted pair connections may also be used between the CMUs 42. Functions that involve binary transmission or analog electrical measurements and transmission may continue to be conducted over the LV serial connections 21A, 21B, and 21C as explained above with reference to FIG. 2.

Also modified from FIG. 2 is the construction of the GMU 40. In FIG. 2, the GMU 40 is integrated with a CMU 42 to provide cell sense function and voltage isolation. In FIG. 3, an HV sensing printed circuit board (HV-PCB) 142 may be used to perform voltage isolation, with the voltage isolation hardware of FIG. 2, i.e., resistors ($R_L$ and $R_B$), the switch 65, and inductors 66, omitted from FIG. 3 for simplicity. Likewise, the control blocks 54 and 56 of FIG. 2 are combined in FIG. 3 into a control block 154 (P2-P3), again with the voltage measurement hardware of FIG. 2 omitted for simplicity. The HV-PCB 142 may also include an analog-to-digital converter that converts measured analog data to digital data for transmission to the LV controller 50.

Figure 4:
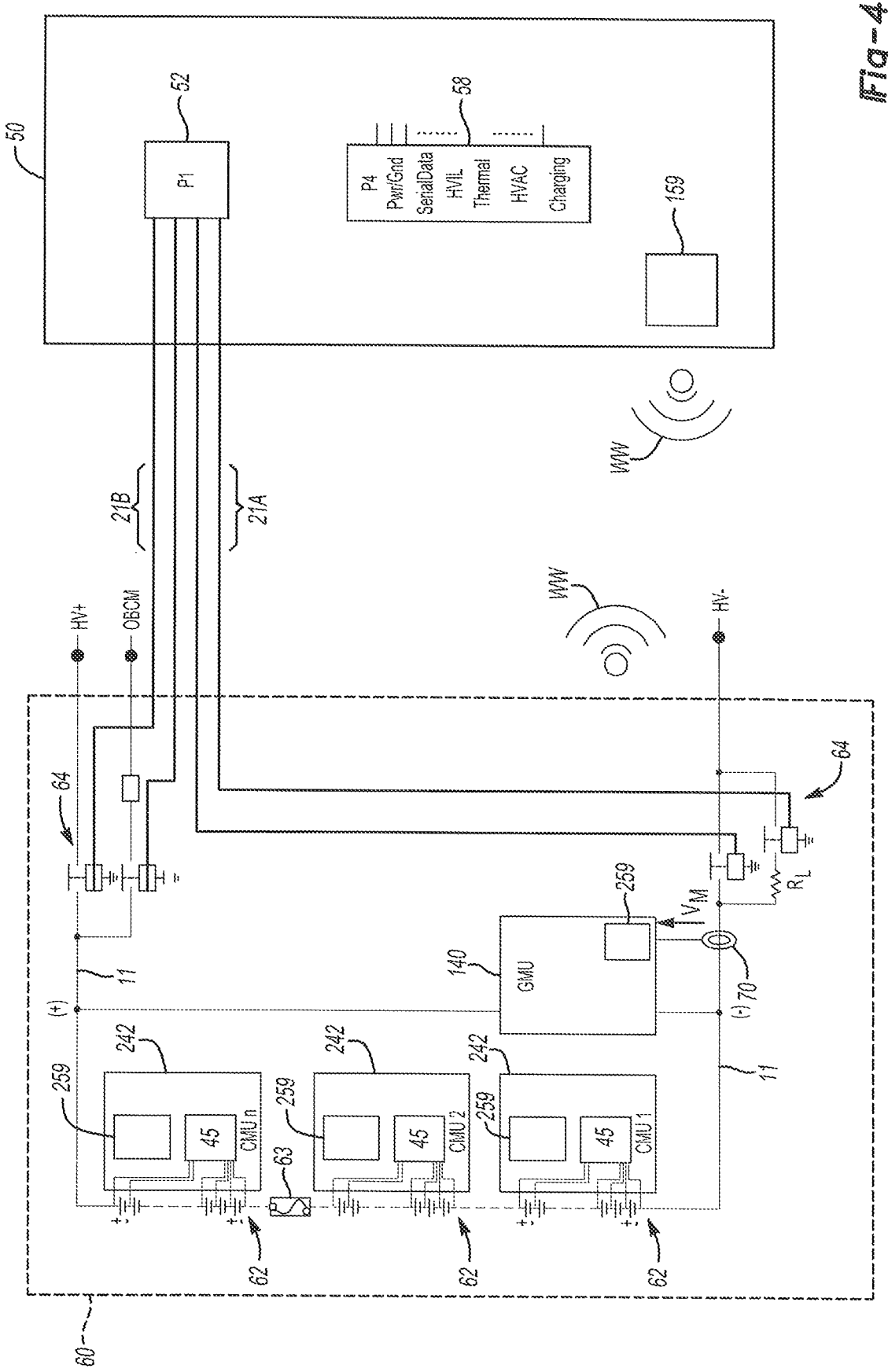
FIG. 4 is a schematic control diagram describing a wireless/RF alternative implementation to the hardwired embodiments of FIGS. 2 and 3.

FIG. 4 depicts a wireless/radio frequency (RF) embodiment that may be used as an alternative approach to the hardwired implementations of FIGS. 2-3. RF signal transmission between the RESS 60 and the LV controller 50 is conducted over a wireless pathway WW at low-voltage, and thus the physical LV serial connections 21D and 21E of FIGS. 2 and 3 are eliminated. Instead, each CMU 42 is replaced with a modified CMU 242 in which an RF transceiver chip 259 wirelessly reports electrical measurements taken by the resident cell sense hardware 45 for the proximate battery cells 62. In the example RF implementation of FIG. 4, the functions performed by the third control block 56 of the LV controller 50 in FIGS. 2 and 3 is instead conducted by the RESS 60, e.g., via the GMU 140, and then reported over the wireless pathway WW via an RF transceiver chip 159.

Using the disclosed LV architecture noted above, whether in the example vehicle 12 of FIG. 1 or in other systems or devices employing the HV electrical system 10, thus enables a common LV control strategy. The LV controller 50 and an HV ASIC architecture allows for use of a single LV controller 50 for control of the HV electrical system 10, with the constituent control blocks of the LV controller 50 being reused across different platforms to ensure a robust design and packaging flexibility. As a structural benefit, the number of wires into and out of the RESS 60 may be reduced, which in turn reduces the overall size of electrical connectors and internal wire bundles. The LV controller also allows external packaging to the RESS 60, reduces mass inside of the RESS 60, and improves overall exchange flexibility.

By eliminating HV considerations from the LV controller 50, the complexity of packaging and design release of the LV controller 50 may be reduced, with a common implementation solution provided for different configurations of the battery cells 62. In some embodiments, a single microprocessor may be used to implement all of the BMS functions of the LV controller 50 shown in FIGS. 2-4, with HV ASICs used to implement the high-voltage sensing functions conducted internal to the RESS 60. These and other attendant benefits will be appreciated by those of ordinary skill in the art in view of the present disclosure.

The detailed description and the drawings are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A high-voltage (HV) electrical system comprising: an HV electrical bus having positive and negative voltage rails; a low-voltage (LV) controller operating at an auxiliary voltage level, the LV controller including a plurality of LV control blocks and a non-transitory memory device storing instructions executable via the LV control blocks to perform designated battery management system (BMS) functions within the HV electrical system; and a rechargeable energy storage system (RESS) operating at a main voltage level, greater than the auxiliary voltage level, and connected to the HV electrical bus, the RESS including: a battery pack having a plurality of battery cells; a current sensor connected to one of the positive or negative voltage rails, the current sensor being configured to measure a pack current of the battery pack, and to output a low-voltage signal indicative of the measured pack current; a plurality of cell monitoring units (CMUs) each electrically connected to designated battery cells of the plurality of battery cells and configured to measure corresponding cell voltages of the designated battery cells; and a voltage isolation hardware disposed between the plurality of CMUs and the LV controller, the voltage isolation hardware including first and second sets of contactors connected to the positive and negative voltage rails, respectively, wherein the RESS and the LV control blocks of the LV controller are connected via LV serial connections such that the LV control blocks of the LV controller perform the designated BMS functions, including controlling an open/closed state of the first and second sets of contactors and determining the pack current of the battery pack using the low-voltage signal from the current sensor.

2. The HV electrical system of claim 1, wherein the voltage isolation hardware includes a transformer.

3. The HV electrical system of claim 2, wherein the transformer is integrated within one of the plurality of CMUs.

4. The HV electrical system of claim 3, wherein the voltage isolation hardware further includes: a first current limiting resistor connected to the negative voltage rail, a second current limiting resistor connected to the positive voltage rail, a bias resistor connected to one of the positive or negative voltage rails, and a switch selectively connecting the bias resistor to the LV controller, wherein the LV controller is configured to measure a level of voltage isolation using a voltage divider arrangement and operation of the switch.

5. The HV electrical system of claim 1, wherein the LV controller is further configured, as part of the designated BMS functions, to monitor high-voltage interlock signals, thermal conditions of the battery cells, and/or charging operations of the battery cells.

6. The HV electrical system of claim 1, wherein each of the plurality of CMUs includes a respective radio frequency (RF) transceiver, and the LV controller includes another RF transceiver, and wherein the RF transceivers of the CMUs wirelessly transmit the corresponding cell voltages to the RF transceiver of the LV controller.

7. The HV electrical system of claim 1, wherein the LV serial connections include a twisted pair of conductors, and the corresponding cell voltages are digital voltage signals communicated via the twisted pair of conductors.

8. The HV electrical system of claim 1, wherein the LV serial connections include a pair of straight conductors, and the corresponding cell voltages are analog voltage signals communicated via the pair of straight conductors.

9. The HV electrical system of claim 1, further comprising an electric machine that is electrically connected to the RESS.

10. A powertrain system comprising: a polyphase electric machine having a rotor; a load a transmission having an input member selectively coupled to the rotor, and an output member coupled to the load; and a high-voltage (HV) electrical system that includes: an HV electrical bus having positive and negative voltage rails; a low-voltage (LV) controller operating at an auxiliary voltage level and including a plurality of LV control blocks and a non-transitory memory device storing instructions executable via the LV control blocks to perform designated battery management system (BMS) functions within the HV electrical system; and a rechargeable energy storage system (RESS) operating at a main voltage level, greater than the auxiliary voltage level, and connected to the HV electrical bus, the RESS including: a battery pack having a plurality of battery cells; a current sensor connected to one of the positive or negative voltage rails, the current sensor being configured to measure a pack current of the battery pack, and to output a low-voltage signal indicative of the measured pack current; a plurality of cell monitoring units (CMUs) each electrically connected to designated battery cells of the plurality of battery cells, and configured to measure corresponding cell voltages of the designated battery cells; and a voltage isolation hardware disposed between the plurality of CMUs and the LV controller, the voltage isolation hardware including first and second sets of contactors connected to the positive and negative voltage rails, respectively, wherein the RESS and the LV control blocks of the LV controller are connected via LV serial connections such that the LV control blocks of the LV controller perform the designated BMS functions, including controlling an open/closed state of the first and second sets of contactors, and monitoring the pack current of the battery pack using the low-voltage signal from the current sensor.

11. The powertrain system of claim 10, wherein the electric powertrain system is used aboard a motor vehicle having drive wheels as the load.

12. The powertrain system of claim 10, wherein the voltage isolation hardware includes a transformer.

13. The powertrain system of claim 12, wherein the transformer is integrated within a CMU of the plurality of CMUs.

14. The powertrain system of claim 13, wherein the voltage isolation hardware further includes: a first current limiting resistor connected to the negative voltage rail, a second current limiting resistor connected to the positive voltage rail, a bias resistor connected to one of the positive or negative voltage rails, and a switch selectively connecting the bias resistor to the LV controller, wherein the LV controller is configured to measure a level of voltage isolation using voltage sensors, a voltage divider arrangement, and operation of the switch.

15. The powertrain system of claim 10, wherein the LV controller is further configured, as part of the designated BMS functions, to monitor high-voltage interlock signals, thermal conditions of the battery cells, and/or charging operations of the battery cells.

16. The powertrain system of claim 10, wherein each of the plurality of CMUs includes a respective radio frequency (RF) transceiver and the LV controller includes another RF transceiver, and wherein the RF transceivers of the CMUs wirelessly transmit the corresponding cell voltages to the RF transceiver of the LV controller.

17. The powertrain system of claim 10, wherein the LV serial connections include a twisted pair of conductors, and the corresponding cell voltages are digital voltage signals communicated via the twisted pair of conductors.

18. The powertrain system of claim 10, wherein the LV serial connections include a pair of straight conductors, and the corresponding cell voltages are analog voltage signals communicated via the pair of straight conductors.

19. The HV electrical system of claim 1, wherein each of the LV control blocks includes a respective application-specific integrated circuit (ASICs) or a processor chip hardwired directly to the RESS via a respective one or ones of the LV serial connections to thereby exchange LV analog data signals between the LV control blocks and the RESS.

20. The HV electrical system of claim 1, wherein the auxiliary voltage level is about 15 volts direct current (VDC) or less, and the main voltage level is about 60 VDC or more.

* * * * *